United States Patent [19]

Tateoka et al.

[11] 4,259,004
[45] Mar. 31, 1981

[54] SCANNING DEVICE WITH OPTICAL PATH LENGTH COMPENSATOR

[75] Inventors: Masamichi Tateoka, Kawasaki; Toshiaki Asano; Kazuo Minoura, both of Yokohama; Setsuo Minami, Kawasaki, all of Japan

[73] Assignee: Canon Kabushiki Kaisha, Tokyo, Japan

[21] Appl. No.: 48,257

[22] Filed: Jun. 13, 1979

[51] Int. Cl.³ .............................................. G03G 15/30
[52] U.S. Cl. ...................................................... 355/8
[58] Field of Search ................... 355/8, 11, 66, 49, 57, 355/60; 350/6.91

[56] References Cited

U.S. PATENT DOCUMENTS

| 3,709,602 | 1/1973 | Satomi | 355/11 X |
| 3,997,260 | 12/1976 | Mihalik et al. | 355/11 X |
| 4,213,690 | 7/1980 | Sugiura et al. | 355/8 |

*Primary Examiner*—William H. Beha, Jr.

[57] ABSTRACT

A scanning device for scanning a flat scanned surface by means of a rotating or rotatively vibrating deflector. The scanning device is provided with a rotational asymmetric image forming optical system disposed between the deflector and the scanned surface for forming an image of the scanned surface at a substantially equal distance from the deflecting surface of the deflector in the plane defined by the path of movement of the normal to the deflecting surface of the deflector in accordance with the rotation thereof.

9 Claims, 15 Drawing Figures

SCANNING DEVICE WITH OPTICAL PATH LENGTH COMPENSATOR

BACKGROUND OF THE INVENTION

1. Field of the Invention

This invention relates to a scanning device using a deflector rotating or rotatively vibrating at high speed, and more particularly to a scanning device suited for scanning a scanned surface in a slit-like fashion.

2. Description of the Prior Art

In scanning a flat scanned surface by the use of a deflector which is rotating or rotatively vibrating, there has been a difficulty that the length of the light path between the deflector and the scanned surface varies with rotation of the deflector. Therefore, in a device incorporating such a scanning system, it is necessary to correct the variation in the length of the light path by some means. In FIG. 1 of the accompanying drawings which schematically shows an example of the copying optical system incorporating such a scanning device, a scanned surface 1 forms a cylindrical plane centered at the axis of rotation 2 of a rotatable mirror 3. Thus, the light beam from the scanned surface 1 is deflected by the rotatable mirror 3 and when the light beam reaches a recording drum 5 through an image forming lens system 4, the length of the light path between the scanned surface and the recording drum 5 is always maintained constant irrespective of the angle of rotation of the rotatable mirror 3. However, such use of a cylindrical surface as the scanned surface not only involves the difficulty of making a large cylindrical surface but also encounters the inability to scan a flat scanned object.

SUMMARY OF THE INVENTION

It is an object of the present invention to eliminate the above-noted disadvantage and to provide a scanning device in which, even if the scanned surface is a flat surface, the length of the light path is corrected when the scanned surface is scanned by means of a rotating or rotatively vibrating deflector.

It is a further object of the present invention to provide a scanning device of the above-described construction which enables scanning at uniform velocity over the scanned surface.

It is still a further object of the present invention to provide a scanning device in which the correction of the length of the light path can be achieved by a simple optical construction.

In the scanning device according to the present invention, these objects may be achieved by providing a rotational asymmetric image forming optical system between a rotating or rotatively vibrating deflector and a flat scanned surface.

The rotational asymmetric image forming optical system forms an image of a flat scanned surface as if the position of this image were at a substantially equal distance from the deflecting surface of the deflector, in the plane formed by the path of movement of the normal to the deflecting surface of the deflector during the rotation of the deflector (such plane will hereinafter be referred to as the deflected scanning plane). In other words, if a perpendicular is drawn at each point of the image of the scanned surface formed by the asymmetric optical system in the deflected scanning plane, the distances along the perpendiculars between the image of the scanned surface and the deflecting surface will be substantially equal to each other.

In the scanning device according to the present invention, the rotational asymmetric optical system satisfies the following conditions in the tertiary aberration area in the deflected scanning plane:

$$III = 0, \; P = 1/g'$$

where III represents astigmatism, P represents Petzval sum, and $g'$ represents the distance from the deflecting surface of the deflector to the image of the scanned plane in a line passing through the center of the image of the scanned plane and perpendicular to the scanned plane in the deflected scanning plane. If the image of the scanned plane by the rotational asymmetric image forming optical system is a virtual image, $g'$ represents a negative amount, and if the image of the scanned plane is a real image, $g'$ represents a positive amount.

Further, in the scanning device of the present invention, the value of the tertiary distortion V of the rotational asymmetric image forming optical system is $-\frac{2}{3}$ in the deflected scanning plane in order to scan the scanned plane at a uniform velocity when the deflecting surface of the deflector is rotated at a uniform angular velocity.

In the scanning device of the present invention, there are two available scanning methods, i.e. the scanning method whereby, as in the conventional copying apparatus, the scanned surface is slit-scanned with a certain predetermined slit width with respect to the deflected scanning plane, or the so-called two-dimensional scanning method for the scanned plane whereby a beam scans at high speed in the lengthwise direction of the slit, namely, in the direction orthogonal to the deflected scanning plane on the scanned surface and in this condition, the beam also scans in the deflected scanning plane. Also, the scanning of the scanned surface can effect reading of information from the scanned surface or writing of information into the scanned surface.

Thus, with the scanning device of the present invention, it is possible to scan a flat scanned surface at high speed without strain.

The invention will become more fully apparent from the following detailed description thereof taken in conjunction with the accompanying drawings.

DESCRIPTION OF THE PREFERRED EMBODIMENTS

Figure 2A:
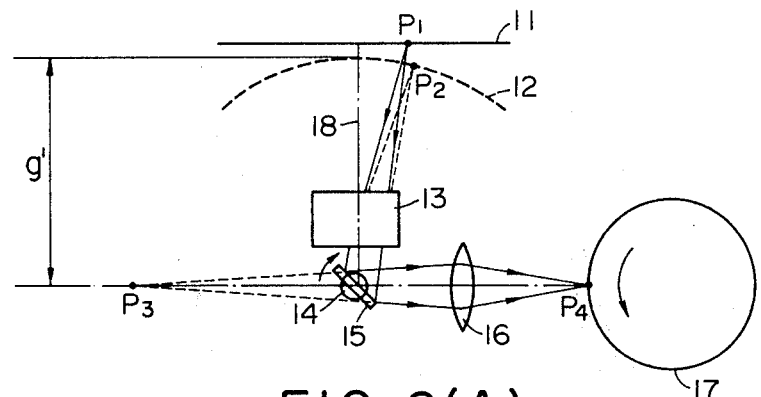
FIGS. 2(A), (B), (C) and (D) illustrate the principle of the scanning device according to the present invention.

FIGS. 2(A), (B), (C) and (D) are views for illustrating the principle of the scanning device according to the present invention, and show the scanning device as applied to a recording apparatus. In FIGS. 2(A) to (D), an image 12 of a scanned plane 11 is formed by a rotational asymmetric image forming optical system 13 disposed between the scanned plane 11 and a rotatable mirror 15 rotatable about an axis of rotation 14. The rotational asymmetric image forming optical system 13 is such that the image 12 of the scanned surface is formed into a cylindrical plane shape in a plane defined by rotation of the normal to the rotatable mirror 15 (in FIG. 3, this plane is a plane parallel to the plane of the drawing sheet and is the same as the aforementioned deflected scanning plane). In the deflected scanning plane, a line 18 passing through the center of the cylindrical image 12 of the scanned plane and perpendicular to the scanned plane 11 passes through the axis of rotation 14 of the rotatable mirror 15. The image 12 is formed into a cylindrical shape such that it is substantially equidistant as viewed from the position whereat the line 18 intersects the deflected plane of the rotatable mirror (in FIG. 3, this position may be substantially regarded as the axis of rotation 14). Therefore, the light beam emanating from a point $P_1$ on the scanned plane 11 enters the rotational asymmetric optical system 13 and enters the rotatable mirror 15 as if the light beam emerged from a point $P_2$ on the conjugate image 12 thereof.

The rotatable mirror 15 is rotated so as to form the mirror image of the image point $P_2$ always at a predetermined position $P_3$. The mirror image formed at the point $P_3$ is focused at a predetermined position $P_4$ on a recording drum 17 by an image forming lens system 16. Thus, with the rotation of the rotatable mirror 15, the scanned point $P_1$ on the scanned plane 11 moves on the scanned plane 11 in the aforementioned deflected scanning plane (the plane of the drawing sheet) and is always focused at the point $P_4$ on the recording drum 17 through the rotational asymmetric image forming optical system 13, the rotatable mirror 15 and the image forming lens system 16. Therefore, if the recording drum 17 is rotated in synchronism with the angular velocity of the rotatable mirror 15, the information on the scanned plane 11 may be recorded on the recording drum 17.

Figure 2B:
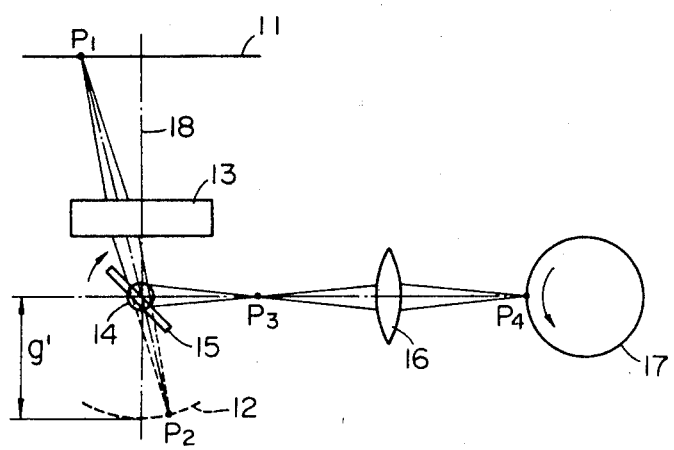
Figure 2C:
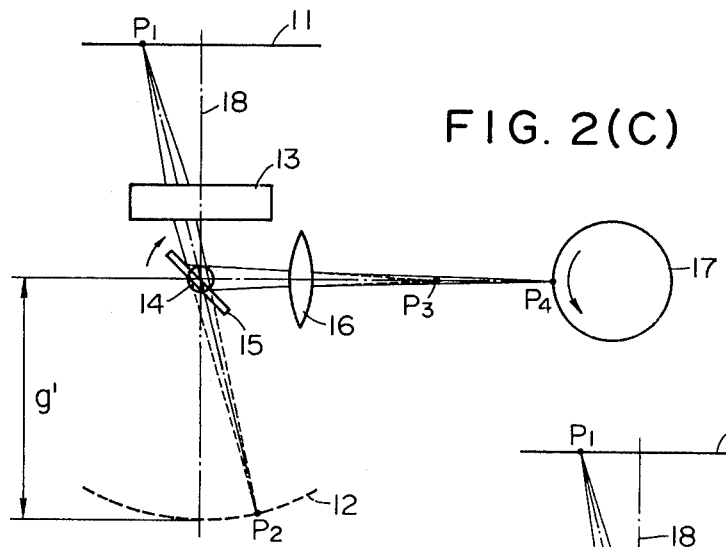
Figure 2D:
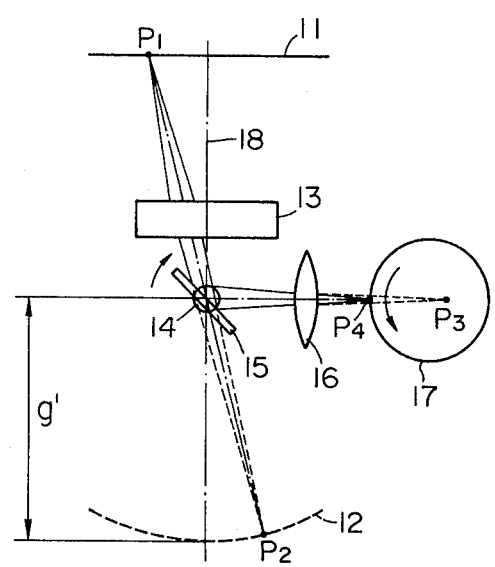

In the scanning device shown in FIG. 2(A), the image 12 of the scanned plane 11 is a virtual image created between the scanned plane 11 and the rotational asymmetrical image forming optical system. The image 12 of the scanned plane shown in FIGS. 2(B), (C) and (D) is a real image and the position of the image 12 is that when the optical system is typically developed, and the actual light beam is reflected by the mirror 15 and focused at the position of the point $P_3$. FIG. 2(B) shows the case where this point $P_3$ lies between the mirror 15 and the image forming lens 16, which has a positive refractive power. FIG. 2(D) shows the case where this point $P_3$ is created more toward the center of the drum 17 than the image forming position $P_4$ on the recording drum 17, and in this case the image forming lens system 16 has a positive refractive power.

Figure 1:
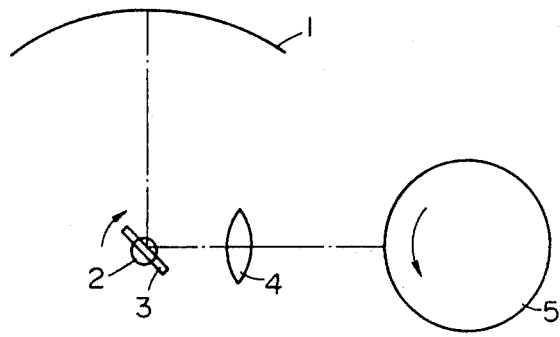
FIG. 1 shows an example of the copying optical system using a scanning device according to the prior art.

As shown in FIGS. 2(A)-(D), according to the present invention, the image 12 of the scanned plane 11 is formed by the rotational asymmetric image forming optical system 13 so that the flat scanned plane 11 may become a plane equivalent to the cylindrical scanned surface 1 shown in FIG. 1, thus enabling the scanning of the flat scanned surface.

The rotational asymmetric image forming optical system forms the image of the scanned plane 11 into a cylindrical image 12 in the deflected scanning plane as noted above, and therefore, in the tertiary aberration area, the tertiary astigmatism coefficient III and Petzval sum P satisfy the following conditions:

$$III = 0, \ P = 1/g' \quad (i)$$

where $g'$ represents the distance from the point whereat the above-mentioned line 18 (which actually is coincident with the optic axis of the rotational asymmetric image forming optical system) intersects the rotatable mirror to the image 12 along the line 18, and the physical amount of $g'$ is negative when the image 12 of the scanned plane 11 formed by the image forming optical system 13 is a virtual image as shown in FIG. 2(A), while the physical amount of $g'$ is positive when the image of the scanned plane 11 formed by the image forming optical system 13 is a real image as shown in FIGS. 2(B), (C) and (D).

Also, in order to scan the scanned plane at a uniform velocity when the rotatable mirror 15 is rotated at a uniform velocity, the value of the distortion coefficient V of the rotational asymmetric image forming optical system 13 in the aforementioned deflected scanning plane is rendered to:

$$V = -\tfrac{2}{3} \quad (ii)$$

However, as a condition for determining the foregoing distortion coefficient, use is made of an exit pupil radius regularized so that the height from the optic axis at the central position of the rotatable mirror 15 (namely, the exit pupil position) in the deflected scanning plane containing the optic axis 18 of the rotational asymmetric image forming optical system 13 is 1.0.

Figure 3:
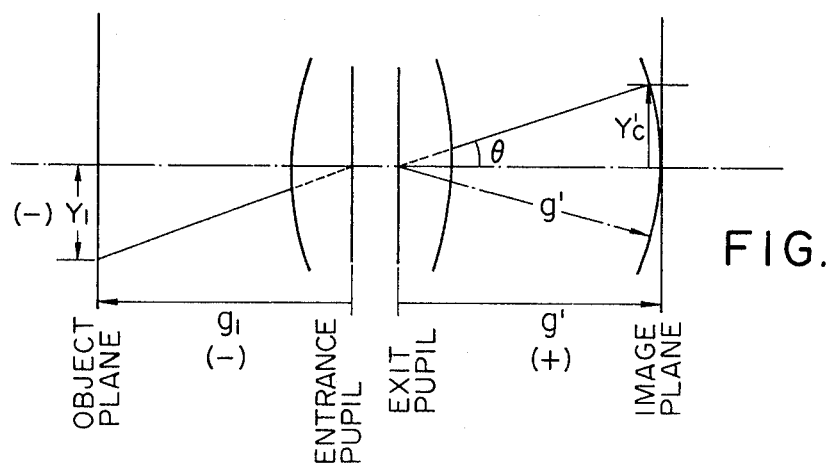
FIGS. 3 and 4 illustrate a rotational asymmetric image forming optical system used with the device of the present invention.
Figure 4:
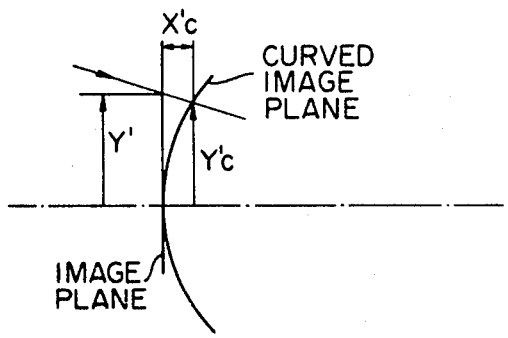

Description will now be made of the foregoing conditions (i) and (ii) which are satisfied by the rotational asymmetric image forming optical system. FIG. 3 is an illustration for this, and the condition of uniform velocity will first be considered. The rotatable mirror 15 of FIG. 2 lies at the position of the exit pupil of the rotational asymmetric image forming optical system 13 and is rotating at a uniform angular velocity. A minute portion $\Delta l$ of the image plane lying on a circular arc of a radius $g'k$ (in FIG. 3, the co-ordinates system is the right-hand system and in this case $g'k$ is a positive amount from the definition, but $g'k = g'$ shown in FIG. 2(A) is a negative amount) is represented as $$\Delta l = g' \cdot \Delta \theta \quad (1).$$

where $\Delta \theta$ is the minute angle of rotation of the rotatable mirror. Since the rotatable mirror is rotating at a uniform angular velocity, $$\Delta \theta = \omega dt \quad (2)$$

where $\omega$ is the angular velocity of the mirror (constant). Thus, $$\Delta l = g' \omega dt \tag{3}$$

Also, if $\Delta Y_1$ is a minute portion of the scanned plane, the following condition must be satisfed in order that the scanned surface may be scanned at a uniform velocity:

$$\Delta l = g' \omega dt = \beta \Delta Y_1 \tag{4}$$

($\beta$: magnification)
From equation (4), $$\omega dt = (\beta/g') \Delta Y_1$$

Integrating the both sides gives:

$$\omega t = (\beta/g') Y_1 + C_1 \tag{5}$$

($C_1$: integration constant)
When $Y_1 = 0$, $t = 0$ and hence $C_1 = 0$. Thus, $$\omega t = (\beta/g') Y_1 \tag{6}$$

From FIG. 3, $\omega t = \theta$ and if the ideal image height of the curved image plane is the height to the point of intersection between the perpendicular from the optic axis and the circular arc and if this is $Y_c'$, then $$\theta = \sin^{-1}(Y'c/g') \tag{7}$$

Substituting equation (7) for equation (6) results in $$\sin^{-1}\left(\frac{Y_c'}{g'}\right) = \frac{\beta}{g'} Y_1 \tag{8}$$

$$Y_c' = g' \sin\left(\frac{\beta}{g'} Y_1\right)$$

That is, in order to make constant the scanning velocity on the scanned plane, the ideal image height $Y_c'$ must be determined by equation (9).

Developing equation (8) up to the tertiary face results in:

$$Y_c' = g'[(\beta Y_1/g') - (1/6)(\beta Y_1/g')^3] \tag{9}$$

Also, according to the aberration theory, $$\left. \begin{array}{l} \dfrac{1}{g'} = \dfrac{\alpha \overline{\alpha'}}{N'} \\ \beta = \dfrac{\alpha}{\alpha'} \end{array} \right\} \tag{10}$$

where $N'$: refractive index of the image space
  $\alpha$: incidence-converted inclination of the object paraxial ray
  $\alpha'$: emergence-converted inclination of the object paraxial ray
  $\overline{\alpha'}$: emergence-converted inclination of the pupil paraxial ray Hence, substituting equation (10) for equation (9) results in $$Y_c' = (1/2\alpha')[2(\alpha_1 Y_1) - \tfrac{1}{3}(\overline{\alpha'}/N')^2(\alpha_1 Y_1)^3] \tag{11}$$

The second term $(\alpha_1 Y_1)^3$ in the right side of equation (11) is that of the view angle irrespective of the aperture and therefore, from the foregoing aberration theory, the tertiary distortion coefficient $V_c$ with which the image plane is curved is:

$$V_c = \tfrac{1}{3}(\overline{\alpha'}/N')^2 \tag{12}$$

$V_c$ is the condition required by the tertiary distortion coefficient when the image plane is curved, and this is converted into a distortion coefficient $V$ intrinsic to the optical system.
From FIG. 5, $$X'c = \tfrac{1}{2} D_3 Y_c^2 + (\tfrac{1}{8}) D_4^3 Y_c^4 \tag{13}$$

$D_3$ and $D_4$ in equation (13) are the curvature coefficients of the image plane. The image plane lies on the circular arc of a radius $g'$ and hence, according to the aberration theory which is $D_3 = D_4 = -1/g'$, $$V_c = V + (\overline{\alpha'}/\alpha')(D_3/N') \tag{14}$$

Hence, $$V = V_c - (\overline{\alpha'}/\alpha')(D_3/N')$$

Substituting $D_3 = 1/g'$, and equation (12) for this results in $$V = -\tfrac{2}{3}(\overline{\alpha'}/N')^2 \tag{15}$$

$\overline{\alpha} R'$ is the regularization considered on the exit pupil standard and hence $\overline{\alpha'} = -1$, while $N'$ is the refractive index of the image space and hence, $N' = 1$. Therefore, if the tertiary distortion $V$ of the rotational asymmetric image forming optical system is $-\tfrac{2}{3}$, the scanning at a uniform velocity is possible.

The foregoing condition (i) will now be described. The astigmatism coefficient $III_c$ and the sagittal image plane curvature coefficient $IV_c$ when the image plane is curved may be represented as follows, in the aberration coefficients $III$ and $IV$ intrinsic to the optical system, from the foregoing aberration theory:

$$\begin{cases} III_c = III \\ IV_c = IV + \dfrac{D_3}{N'} \end{cases} \tag{16}$$

Accordingly, in order that the image plane may lie on a circular arc of a radius $g'R$, the following must be satisfied:

$$\begin{cases} III_c = III = 0 \\ IV_c = 0 \end{cases} \tag{17}$$

From the lower equation of equations (17), $$IV_c = IV + (D_3/N') = 0$$

Substituting $IV = III + P$ and $D_3 = -1/g'$ results in:

$$III + P - (1/N'g') = 0$$

$III = 0$ from equations (17), and so, in order that $IV_c$ may be $IV_c = 0$, the following must be satisfied:

$$P = 1/N'g' \tag{18}$$

Since $N' = 1$, after all $P$ becomes:

$$P = 1/g'$$

Figure 5:
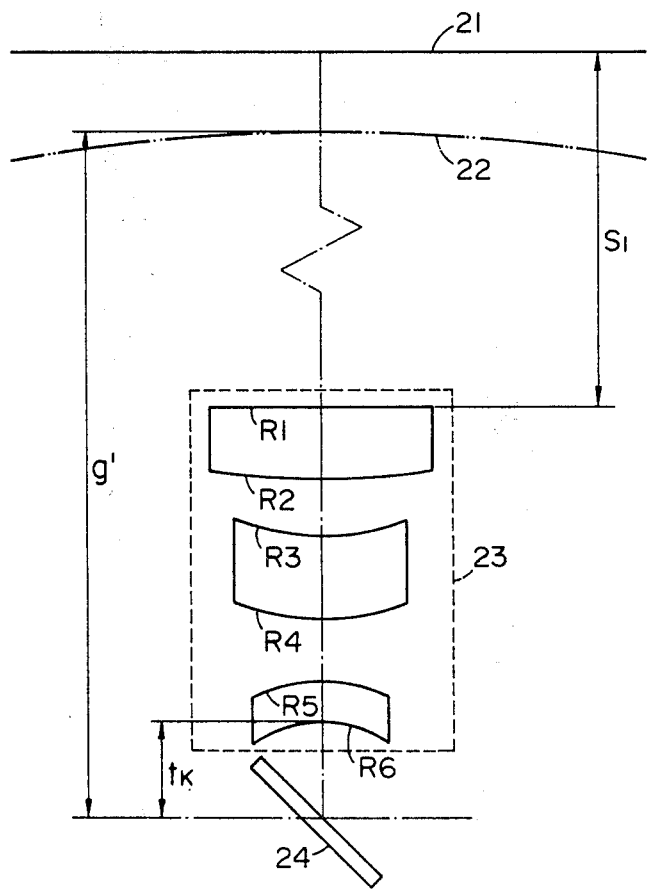
FIG. 5 shows an embodiment of the rotational asymmetric image forming lens used with the device of the present invention.
Figure 6:
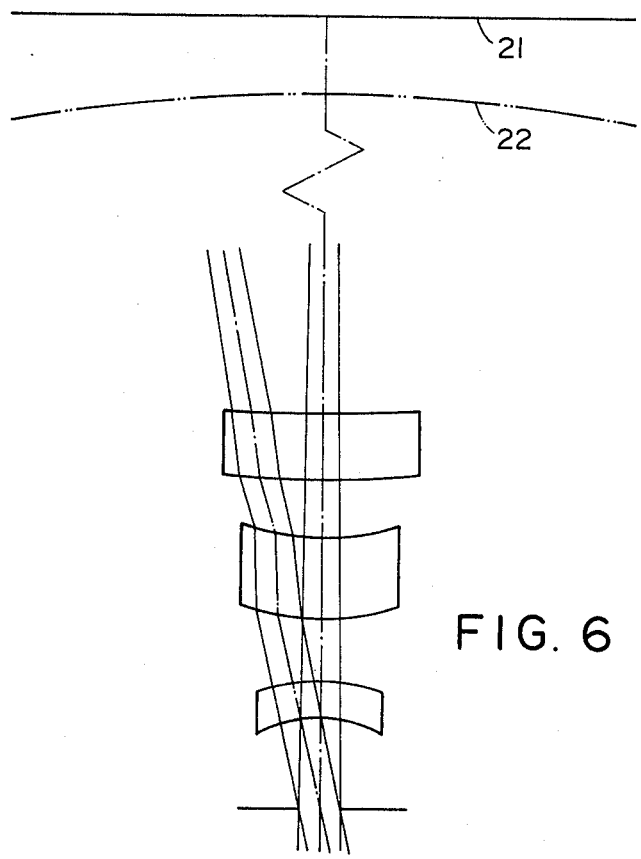
FIG. 6 shows the light path of a lens shown in FIG. 7.

FIG. 5 shows an embodiment of the rotational asymmetric optical system 13 shown in FIG. 2(A). The rotational asymmetric image forming optical system 23 comprises three cylindrical lenses each having a bus line perpendicular to the plane of the drawing sheet of FIG. 5. The rotational asymmetric optical system 23 forms a conjugate image of the scanned surface (□170×□170) on the cylindrical plane 22. Since the center axis of the cylindrical plane is made coincident with the axis of rotation of a deflecting mirror 24, the light beam emergent from a point on the scanned surface 21 enters the rotational asymmetric optical system 23, and enters the deflecting mirror 24 as if the light beam emerged from the conjugate image point of the optical system 23, namely, a point on the cylindrical plane 22. FIG. 6 shows the then light path.

Figure 7:
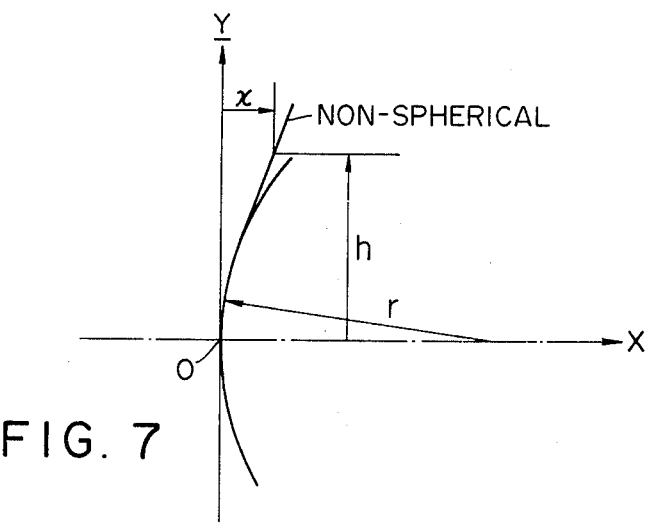
FIG. 7 illustrates the definition of a non-spherical surface.

The construction of the rotational asymmetric optical system 23 will now be described. As mentioned above, the optical system 23 comprises a cylindrical lens having no power in the plane perpendicular to the plane of the drawing sheet and therefore, the curvature R within a plane parallel to the plane of the drawing sheet, the non-spherical coefficients B and C shown in equation (13), the inter-surface spacing D and the refractive index N are indicated.

$$X = \frac{(\frac{1}{r})h^2}{1 + \sqrt{1 - (\frac{h}{r})^2}} + Bh^4 + Ch^6 \qquad (19)$$

where X is the amount of deviation of Y-co-ordinates at h when the non-spherical shape is as shown in FIG. 7, wherein the paraxial curvature radius at the vertex of the non-spherical plane is R, the X-axis is coincident with the direction of travel of light on the optic axis, and Y-axis is perpendicular to the X-axis and passes through the vertex of the non-spherical plane.

| | R | B | C | D | N |
|---|---|---|---|---|---|
| 1. | −840.0608 | $6.95569 \times 10^{-7}$ | $1.1376 \times 10^{-14}$ | 16.65094 | 1.82903 |
| 2. | −291.6568 | $-1.60005 \times 10^{-6}$ | $7.69813 \times 10^{-15}$ | 14.50641 | 1 |
| 3. | −58.20069 | $-5.39102 \times 10^{-6}$ | $-1.06235 \times 10^{-12}$ | 20.29975 | 1.85001 |
| 4. | −70.92207 | $-9.681062 \times 10^{-7}$ | $2.35431 \times 10^{-12}$ | 15.23737 | 1 |
| 5. | 37.93527 | $5.76437 \times 10^{-7}$ | $-7.67487 \times 10^{-11}$ | 10.02002 | 1.51752 |
| 6. | 32.32381 | $-1.57777 \times 10^{-6}$ | $1.1708 \times 10^{-9}$ | | 1 |
| | $S_1 = -430$ | | $g' = -509.78$ | $t_k = 23.5322$ | | where $S_1$ represents the axial spacing from the $R_1$ surface of the lens system 23 to the scanned plane 21, and $t_k$ represents the axial spacing from the $R_6$ surface of the lens system 23 to the deflecting mirror 24.

Next shown are aberration coefficients in the plane of the optical system parallel to the plane of the drawing sheet.

I = 0.00000020451
II = 0.000006828
III = −0.0000021
P = −0.0019621
V = −0.62445
f = 39441.108

Figure 8:
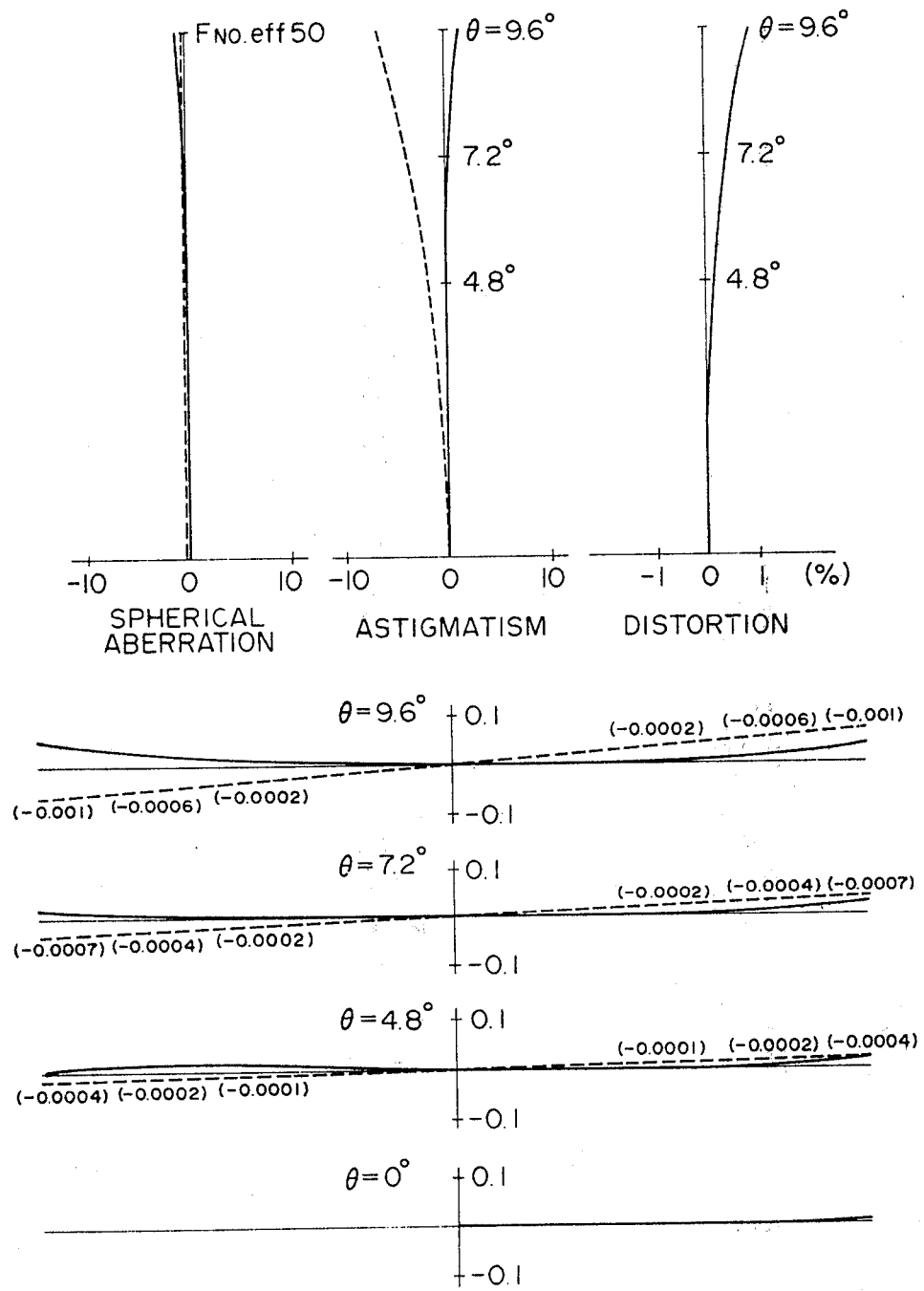
FIGS. 8, 9 and 10 show the aberrations in the lens shown in FIG. 6.
Figure 9:
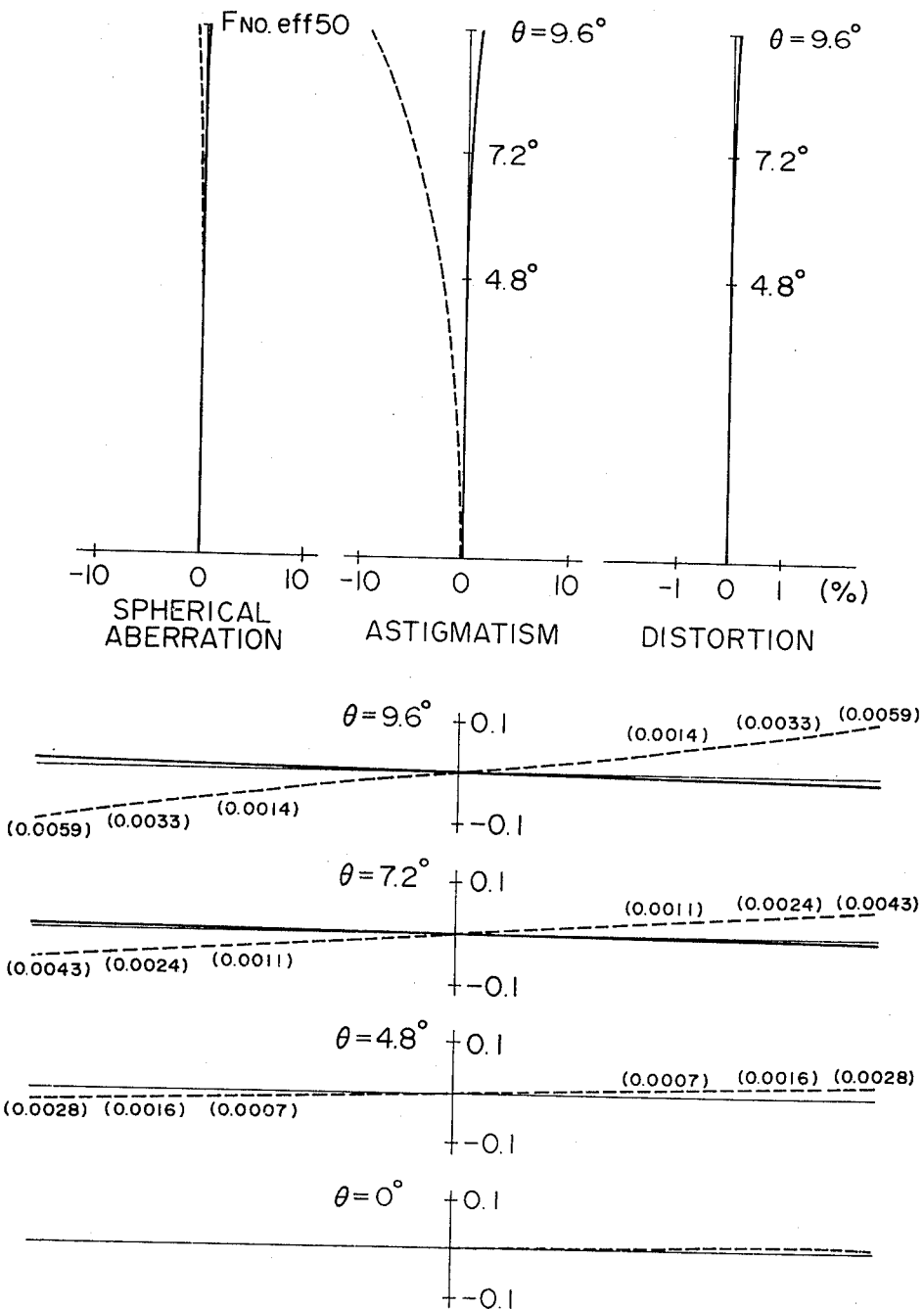
Figure 10:
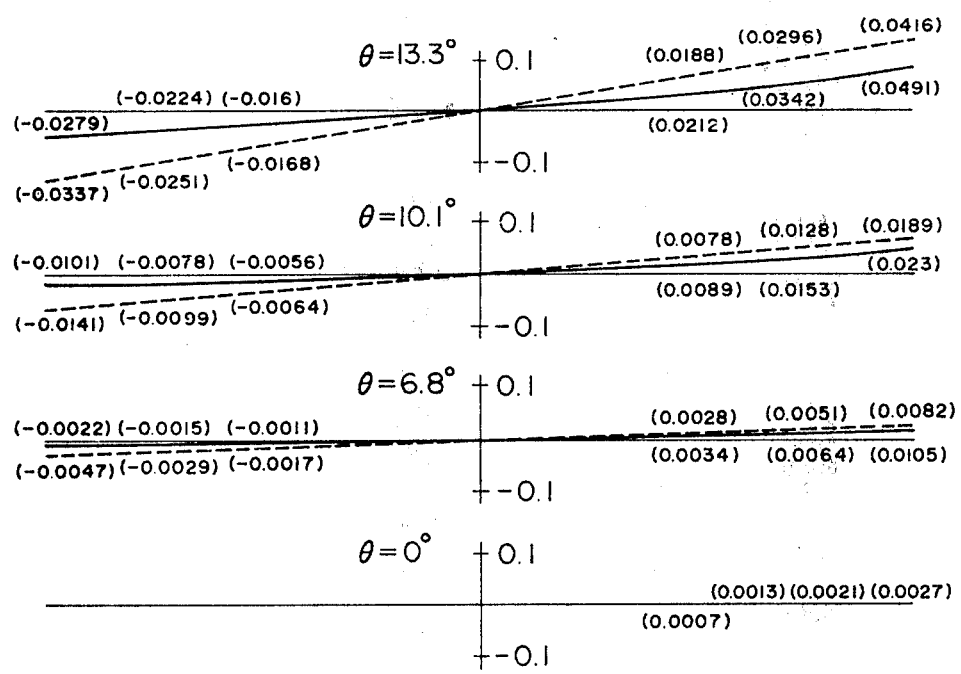

FIG. 8 shows the abberations in the plane of the rotational asymmetric image forming optical system of FIG. 5 parallel to the plane of the drawing sheet, FIG. 9 shows the aberrations in the plane of the rotational asymmetric image forming optical system of FIG. 5 perpendicular to the plane of the drawing sheet, and FIG. 10 shows the aberrations in a plane rotated by 45° from the plane of the rotational asymmetric image forming optical system of FIG. 5 parallel to the plane of the drawing sheet, namely, in the diagonal direction of the scanned plane.

Figure 11:
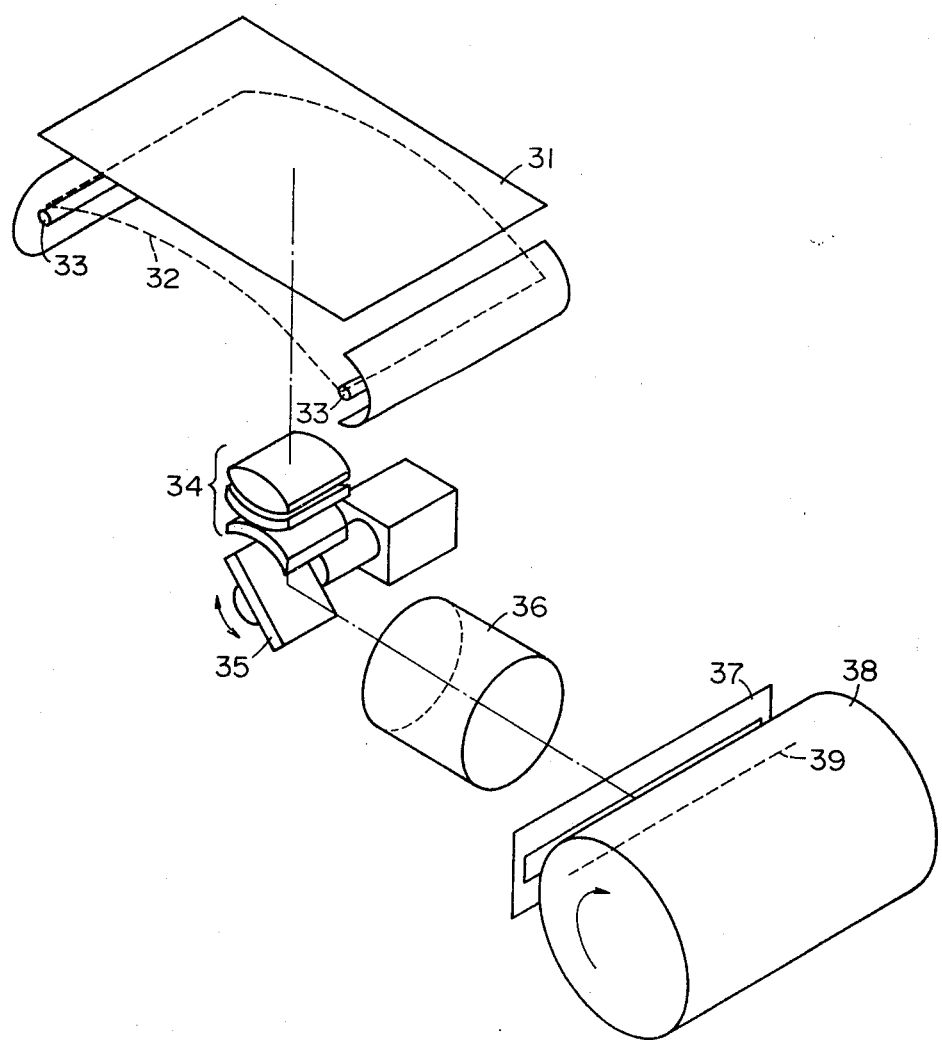
FIG. 11 shows an application of the scanning device of the present invention to a copying apparatus.

FIG. 11 shows an embodiment of the copying machine to which the scanning device of the present invention is applied, and particularly shows the portions of the machine which are adjacent to the optical system. In FIG. 11, there is seen an original 31, the conjugate image 32 of the original 31 formed by the rotational asymmetric lens 34, an illuminating device 33, a deflecting mirror 35, an image forming lens 36, a slit 37 and a cylindrical drum 38. The light beam from the original 31 enters the rotational asymmetric lens 34, and enters the deflecting mirror 35 as if the light beam emerged from the conjugate image point of the lens 34, namely, a point on the cylindrical plane 32. The deflecting mirror 35 is rotatively vibrated so that the mirror image of a linear image containing the aforementioned conjugate image point and parallel to the axis of rotation of the deflecting mirror always lies on a line containing the optic axis of the image forming lens 36 and parallel to the axis of rotation of the deflecting mirror. The mirror image is formed on a predetermined line 39 on the cylindrical drum 38 by the image forming lens 36. Therefore, when the deflecting mirror 35 is rotated, the image of a slit 37 formed by the image forming lens 36 and the rotational asymmetric lens 34 scans over the scanned surface 31 from one end to the other end thereof along the scanning direction. Thus, the scanned surface 31 is slit-scanned with a width of the image of the slit 37. A photosensitive medium is provided over the cylindrical drum 38, which is rotated in synchronism with the deflecting mirror 35 so that the original 31 is recorded on the photosensitive medium over the cylindrical drum 38. The photosensitive medium suited for the high-speed copying using such a rotative vibration system may preferably be one basically comprising three layers, for example, a back-up member, a photoconductive layer provided on the back-up member, and an insulating layer provided on the photoconductive layer. The back-up member may be electrically conductive or insulative.

The formation of a latent image on the aforementioned photosensitive medium may be accomplished, for example, by subjecting the photosensitive medium to primary charge and subsequent discharging or charging with the opposite polarity from the primary charge, and then subjecting the photosensitive medium to the whole surface exposure. In this optical system, the deflecting mirror 35 may be rotated at high speed. Thus, there can be achieved a copying apparatus which is high in speed and in which the original surface is flat. In this case, the rotation input structure can be extremely simplified because it is only the rotation of the deflecting mirror 35 that is required.

Figure 12:
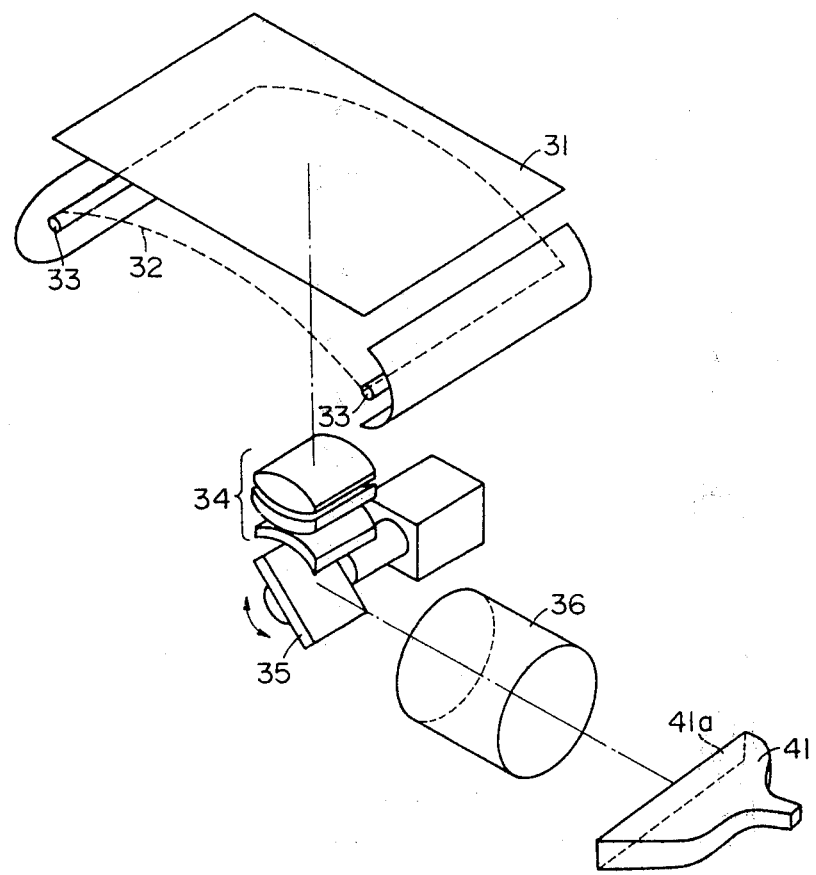
FIG. 12 shows an embodiment of the projecting optical system to which the scanning device of the present invention is applied.

FIG. 12 is a schematic perspective view showing an embodiment of the projecting optical system to which the scanning device of the present invention is applied. Designated by 41 is a CRT or a circle line converter or the like, and the surface 41a thereof indicates information corresponding to one line which is to be written or projected. The information on this surface 41a may be projected, without strain, onto a flat scanned surface 31 through an image forming lens 36, a deflector 35 and a rotational asymmetric lens 34. Information is applied as input to the surface 41a with time, and such information is sequentially projected onto the scanned surface 31 with the rotation of the deflector 71. Means equivalent to the means for indicating information on the surface 41a may also be readily provided by using other optical means.

While a deflector of the rotative vibration type has been shown as the deflector in the above-described embodiment, it is also possible to employ a polygon mirror or the like as the deflector.

What we claim is:

1. A scanning device comprising:
    a flat scanned surface;
    a deflector for deflecting a light beam from said scanned surface into a predetermined direction, said deflector performing its deflecting function by the deflecting surface thereof rotating about an axis of rotation;
    a rotational asymmetric first image forming optical system disposed between said scanned surface and said deflector, the position of the image of said scanned surface formed by said first image forming optical system lying at a substantially equal distance from the deflecting surface of said deflector in a scanning plane defined by the path of movement of the normal to the deflecting surface of said deflector with the deflecting action of said deflector;
    a projection surface onto which the light beam deflected by said deflector is projected at a predetermined position sequentially with time; and
    a second image forming optical system disposed between said deflector and said projection surface for imaging the light beam from said deflector onto said projection surface.

2. The scanning device according to claim 1, wherein the image of the scanned surface by said first image forming optical system is created between said scanned surface and said first image forming optical system.

3. The scanning device according to claim 1, wherein the image of the scanned surface by said first image forming optical system is created between said deflector and said second image forming optical system.

4. The scanning device according to claim 1, wherein the image of the scanned surface by said first image forming optical system is created closer to said projection surface than to said second image forming optical system.

5. The scanning device according to claim 1, wherein in the scanning plane the tertiary astigmatism coefficient III and Petzval sum P of said first image forming optical systems are $$III = 0, P = 1/g'$$

where $g'$ is the distance from said deflecting surface to said scanned surface along a line passing through the center of the image of said scanned surface and perpendicular to said scanned surface in the scanning plane.

6. The scanning device according to claim 1, wherein in the scanning plane the tertiary distortion coefficient V of said first image forming optical system is $V = -\frac{2}{3}$.

7. A copying optical system comprising:
    a flat original carriage for supporting thereon an original to be copied;
    a deflector rotatable about a predetermined axis and having a deflection reflecting surface for deflecting the light beam from said original into a predetermined direction;
    a rotational asymmetric first image forming optical system disposed between said original carriage and said deflector for forming the image of said original at a substantially equal distance from said deflection reflecting surface, in the scanning plane defined by the path of movement of the normal to the deflection reflecting surface of said deflector with the rotation thereof;
    a photosensitive medium receiving the light beam deflected by said deflection reflecting surface; and
    a second image forming optical system disposed between said photosensitive medium and said deflector for imaging the light beam deflected by said deflection reflecting surface onto said photosensitive medium.

8. The copying optical system according to claim 7, wherein said first image forming optical system is an anamorphic optical system comprising a cylindrical lens having a refractive power in the scanning plane.

9. The copying optical system according to claim 8, wherein said photosensitive medium has a photoconductive layer on a back-up member, and an insulating layer on said photoconductive layer.

* * * * *

UNITED STATES PATENT AND TRADEMARK OFFICE
CERTIFICATE OF CORRECTION

PATENT NO. : 4,259,004
DATED : March 31, 1981
INVENTOR(S) : MASAMICHI TATEOKA, ET AL.

It is certified that error appears in the above-identified patent and that said Letters Patent are hereby corrected as shown below:

Column 5, line 34, "$\sin^1$" should be --$\sin^{-1}$--;

Column 5, line 64, the equation should read

-- $Y_c' = \frac{1}{2\alpha'}[-2(\alpha Y_1) + \frac{1}{3}(\frac{\overline{\alpha'}}{N'})^2 (\alpha Y_1)^3]$ ...... (11) --;

Column 6, line 24, "1/g'" should be -- -1/g'--;

Column 10, line 11, Claim 5, "systems" should read --system--.

Signed and Sealed this

Twenty-ninth Day of September 1981

[SEAL]

Attest:

Attesting Officer

GERALD J. MOSSINGHOFF

Commissioner of Patents and Trademarks